US010334784B2

(12) United States Patent
Ricketts et al.

(10) Patent No.: US 10,334,784 B2
(45) Date of Patent: Jul. 2, 2019

(54) STRIPPER PLATE SYSTEM WITH BIASING FORCES

(71) Applicant: CNH Industrial America LLC, New Holland, PA (US)

(72) Inventors: Jonathan E. Ricketts, Coal Valley, IL (US); Michael L. Berggren, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 337 days.

(21) Appl. No.: 15/406,233

(22) Filed: Jan. 13, 2017

(65) Prior Publication Data

US 2018/0199509 A1 Jul. 19, 2018

(51) Int. Cl.
*A01D 45/02* (2006.01)
(52) U.S. Cl.
CPC .......... *A01D 45/023* (2013.01); *A01D 45/02* (2013.01); *A01D 45/021* (2013.01); *A01D 45/025* (2013.01)
(58) Field of Classification Search
CPC .... A01D 45/02; A01D 45/021; A01D 45/023; A01D 45/025
See application file for complete search history.

(56) References Cited

U.S. PATENT DOCUMENTS

| 1,317,542 A | 9/1919 | Botje |
| 5,680,750 A * | 10/1997 | Stefl ..................... A01D 45/021 56/119 |
| 8,220,235 B2 * | 7/2012 | Kowalchuk .......... A01D 45/021 56/62 |
| 8,224,534 B2 * | 7/2012 | Kowalchuk .......... A01D 45/021 460/29 |
| 8,820,039 B2 * | 9/2014 | Werning ............... A01D 45/021 460/5 |
| 9,179,602 B2 | 11/2015 | Vandeven et al. |
| 9,232,693 B2 | 1/2016 | Hendrickson et al. |
| 9,320,196 B2 | 4/2016 | Dybro et al. |
| 2014/0230392 A1 * | 8/2014 | Dybro .................. A01D 45/021 56/10.2 R |
| 2016/0174461 A1 | 6/2016 | Walker et al. |

OTHER PUBLICATIONS

European Search Report for European Application No. 18150874.8, dated Jun. 18, 2018 (4 pages).

* cited by examiner

*Primary Examiner* — Alicia Torres
(74) *Attorney, Agent, or Firm* — Peter K. Zacharias; Patrick M. Sheldrake

(57) ABSTRACT

A stripper plate system includes a first stripper plate movably mounted to a frame, a second stripper plate movably mounted to the frame in an opposing orientation to the first stripper plate, and an elongated gap in-between the first and second stripper plates. A first tensioning mechanism biases a proximal end of the first stripper plate toward a center of the elongated gap, a second tensioning mechanism biases a distal end of the first stripper plate toward the center of the elongated gap, a third tensioning mechanism biases a proximal end of the second stripper plate toward the center of the elongated gap, and a fourth tensioning mechanism biases a distal end of the second stripper plate toward the center of the elongated gap. A biasing force of the first and third tensioning mechanisms is lower than a biasing force of the second and fourth tensioning mechanisms.

22 Claims, 8 Drawing Sheets

STRIPPER PLATE SYSTEM WITH BIASING FORCES

BACKGROUND

Harvesters are used in the agricultural industry to harvest a variety of crops. Corn harvesters include headers with a plurality of heads and deck or stripper plate systems in-between the heads for engaging the corn stalk and separating the ear of corn from the stalk. For example, FIG. 1 shows a perspective view of a traditional harvester 10. The harvester 10 includes a header 12 with heads 14. In-between the heads 14, the harvester 10 includes stripper plate systems for separating the ear of corn from the stalk. The harvester 10 generally includes an auger 16. Once separated, the stalk is dispensed onto the field and the ear of corn is transferred via the auger 16 to a processing system 18.

FIG. 2 shows a perspective view of a traditional stripper plate system 20 of the harvester 10. The stripper plate system 20 generally includes first and second stripper plates 22, 24 positioned on opposing sides and defining an elongated gap 26. The first stripper plate 22 is movably mounted to the frame 28 by a linkage system 30. The linkage system 30 biases the first stripper plate 22 in the direction of the second stripper plate 24. The second stripper plate 24 is movably mounted to the frame 28 by a linkage system 32. The linkage system 32 biases the second stripper plate 24 in the direction of the first stripper plate 22.

As the stalk 34 of a corn plant 36 enters the elongated gap 26 at the proximal end 38, the size of the stalk 34 imparts a force against the first and second stripper plates 22, 24 to move the first and second stripper plates 22, 24 laterally away from each other to accommodate the size of the stalk 34. Due to the configuration of the linkage systems 30, 32, moving the first and second stripper plates 22, 24 laterally at the proximal end 38 of the elongated gap 26 simultaneously moves the first and second stripper plates 22, 24 laterally at a distal end 40 of the elongated gap 26 by the same distance. The width or distance 42 between the first and second stripper plates 22, 24 is therefore changed simultaneously along the entire length of the elongated gap 26.

A conveyor system and/or a stalk roll system moves the corn plant 36 towards the distal end 40 of the elongated gap 26, and pulls the stalk 34 downwardly through the elongated gap 26. As the stalk 34 is pulled through the elongated gap 26, the larger dimensioned ears 44 are separated from the stalk 34 by the first and second stripper plates 22, 24. The separated ears 44 can be transferred to the auger 16 by the conveyor system. Maintaining the first and second stripper plates 22, 24 in contact with the stalk 34 during the separation process reduces the amount of shelled corn that can be lost. Due to the different stalk 34 sizes involved in harvesting, a stripper plate system 20 that changes the distance 42 along the entire length of the elongated gap 26 can result in increased corn loss and/or maintenance issues.

For example, if a large diameter stalk 34 enters the elongated gap 26, the distance 42 between the first and second stripper plates 22, 24 is increased and the stalk 34 travels toward the distal end 40. If a small diameter stalk 34 subsequently enters the elongated gap 26 while the large diameter stalk 34 is still between the first and second stripper plates 22, 24, downward pulling of the small diameter stalk 34 with the stalk roll system can result in ears 44 becoming wedged between the first and second stripper plates 22, 24 or ears 44 passing through the elongated gap 26. Such situations necessitate that the user stop the harvesting process to remove the wedged ear 44 or result in a complete loss of the ears 44 that pass through the elongated gap 26.

Some traditional harvesters include stripper plate systems with multiple electronic sensors and electronic controllers that detect the size of the stalk 34 approaching or entering the elongated gap 26. Based on the detected size, the respective controllers are electronically actuated to adjust the position of the first and second stripper plates 22, 24, thereby adjusting the distance 42 between the first and second stripper plates 22, 24. However, the cost for such stripper plate systems and the cost of calibrating and maintaining the accuracy of the sensors and controllers generally outweighs the functional aspects.

SUMMARY

Exemplary embodiments are directed to a stripper plate system that includes stripper plates with proximal and distal ends that are independently biased via non-electronic tensioning mechanisms, such as a rubber bushing, pull spring, torsion spring, or compression spring. In particular, each stripper plate includes a tensioning mechanism at or near the proximal end (e.g., the leading edge) that has a lower biasing force than the tensioning mechanism at or near the distal end. The width or distance between the stripper plates at the proximal and distal ends can therefore be independently adjusted with the tensioning mechanisms in a cost effective manner.

In accordance with embodiments of the present disclosure, an exemplary stripper plate system is provided. The stripper plate system includes a frame, a first stripper plate, and a second stripper plate. The first stripper plate is movably mounted to the frame and includes an elongated body with a proximal end, a distal end, a first lateral side, and a second lateral side. The second stripper plate is movably mounted to the frame in an opposing orientation to the first stripper plate. The second stripper plate includes an elongated body with a proximal end, a distal end, a first lateral side, and a second lateral side. The second stripper plate is movably mounted to the frame such that the first lateral side of the second stripper plate faces the first lateral side of the first stripper plate and forms an elongated gap between the first and second stripper plates. The elongated gap includes a proximal end and a distal end.

The stripper plate system includes a first tensioning mechanism mounted at or near the proximal end of the first stripper plate and biasing the proximal end of the first stripper plate toward a center of the elongated gap. The stripper plate system includes a second tensioning mechanism mounted at or near the distal end of the first stripper plate and biasing the distal end of the first stripper plate toward the center of the elongated gap. The stripper plate system includes a third tensioning mechanism mounted at or near the proximal end of the second stripper plate and biasing the proximal end of the second stripper plate toward the center of the elongated gap. The stripper plate system includes a fourth tensioning mechanism mounted at or near the distal end of the second stripper plate and biasing the distal end of the second stripper plate toward the center of the elongated gap. A biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates. The first and second stripper plates are configured to move laterally upon contact with crop introduced into the elongated gap.

The first and second stripper plates are configured to move laterally relative to the frame independently of each other. The proximal end of the first stripper plate is configured to move laterally relative to the frame independently of the distal end of the first stripper plate. As the proximal end of the first stripper plate moves laterally relative to the frame, the distal end of the first stripper plate pivots at a pivot point. The proximal end of the second stripper plate is configured to move laterally relative to the frame independently of the distal end of the second stripper plate. As the proximal end of the second stripper plate moves laterally relative to the frame, the distal end of the second stripper plate pivots at a pivot axis.

The distal ends of the first and second stripper plates are configured to move laterally relative to the frame independently of the proximal ends of the first and second stripper plates. The elongated gap extends between the first lateral sides of the first and second stripper plates the length of the first and second stripper plates. In a first operative mode, introduction of the crop into the elongated gap at the proximal end of the first and second stripper plates moves the first and second stripper plates laterally at the proximal ends to accommodate a diameter of the crop. Lateral movement of the first and second stripper plates at the proximal ends to accommodate the diameter of the crop results in an increase in a proximal gap distance of the elongated gap.

The first and second stripper plates move laterally at the proximal ends to accommodate the diameter of the crop without changing a distal gap distance between the distal ends of the first and second stripper plates. As the crop moves toward a midpoint of the elongated gap between the proximal and distal ends of the elongated gap, a width of the elongated gap at the midpoint increases while a proximal gap distance of the elongated gap decreases. As the crop moves toward the distal end of the elongated gap, the proximal gap distance of the elongated gap decreases and a distal gap distance of the elongated gap increases.

The first lateral side of the first and second stripper plates can define an outwardly tapering section at the proximal end of the first and second stripper plates. The outwardly tapering section at the proximal end of the first and second stripper plates forms a proximal gap distance dimensioned greater than a distal gap distance. In one embodiment, the first, second, third and fourth tensioning mechanism include at least one of a rubber bushing, a pull spring, a torsion spring, or a compression spring (or combinations thereof). The first and third tensioning mechanisms are different from the second and fourth tensioning mechanisms, thereby imparting different levels of the biasing force.

In accordance with embodiments of the present disclosure, an exemplary harvester header is provided. The harvester header includes a frame and a stripper plate system. The stripper plate system includes a first stripper plate movably mounted to the frame, and a second stripper plate movably mounted to the frame in an opposing orientation to the first stripper plate. The first stripper plate includes an elongated body with a proximal end, a distal end, a first lateral side, and a second lateral side. The second stripper plate includes an elongated body with a proximal end, a distal end, a first lateral side, and a second lateral side. The second stripper plate is movably mounted to the frame such that the first lateral side of the second stripper plate faces the first lateral side of the first stripper plate and forms an elongated gap between the first and second stripper plates. The elongated gap includes a proximal end and a distal end.

The stripper plate system includes a first tensioning mechanism mounted at or near the proximal end of the first stripper plate and biasing the proximal end of the first stripper plate toward a center of the elongated gap. The stripper plate system includes a second tensioning mechanism mounted at or near the distal end of the first stripper plate and biasing the distal end of the first stripper plate toward the center of the elongated gap. The stripper plate system includes a third tensioning mechanism mounted at or near the proximal end of the second stripper plate and biasing the proximal end of the second stripper plate toward the center of the elongated gap. The stripper plate system includes a fourth tensioning mechanism mounted at or near the distal end of the second stripper plate and biasing the distal end of the second stripper plate toward the center of the elongated gap.

A biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates. The first and second stripper plates are configured to move laterally upon contact with crop. The harvester header includes a conveyor system including a first conveyor disposed above the first stripper plate and a second conveyor disposed above the second stripper plate. The first and second conveyors are configured to direct the crop from the proximal end to the distal end of the elongated gap.

The first and second stripper plates can be configured to move substantially laterally relative to the frame independently of each other. The proximal end of the first stripper plate is configured to move laterally relative to the frame independently of the distal end of the first stripper plate. The proximal end of the second stripper plate is configured to move laterally relative to the frame independently of the distal end of the second stripper plate. In a first operative mode, introduction of the crop into the elongated gap at the proximal end of the first and second stripper plates moves the first and second stripper plates laterally at the proximal ends to accommodate a diameter of the crop.

The first lateral side of the first and second stripper plates can define an outwardly tapering section at the proximal end of the first and second stripper plates. The outwardly tapering section at the proximal end of the first and second stripper plates forms a proximal gap distance dimensioned greater than a distal gap distance. In one embodiment, the first, second, third and fourth tensioning mechanism comprise at least one of a rubber bushing, a pull spring, a torsion spring, or a compression spring (or combinations thereof). The first and second conveyors are configured to rotate in opposing directions.

The harvester header can include a roll system including a first roll rotatably disposed below the first stripper plate and a second roll rotatably disposed below the second stripper plate. The first roll can be configured to rotate about a first longitudinal axis and the second roll can be configured to rotate about a second longitudinal axis. The first longitudinal axis can be substantially parallel to the second longitudinal axis. The first and second longitudinal axis can be disposed substantially perpendicularly relative to a lateral direction of movement of the first and second stripper plates. In one embodiment, the first conveyor and the second conveyor each include one or a plurality of chains. In one embodiment, the first conveyor and the second conveyor each include one or a plurality of belts.

In accordance with embodiments of the present disclosure, an exemplary harvester is provided. The harvester includes a header including a frame and a stripper plate system mounted to the frame. The stripper plate system includes a first stripper plate movably mounted to the frame, and a second stripper plate movably mounted to the frame in an opposing orientation to the first stripper plate. The first stripper plate includes an elongated body with a proximal end, a distal end, a first lateral side, and a second lateral side. The second stripper plate includes an elongated body with a proximal end, a distal end, a first lateral side, and a second lateral side. The second stripper plate is movably mounted to the frame such that the first lateral side of the second stripper plate faces the first lateral side of the first stripper plate and forms an elongated gap between the first and second stripper plates. The elongated gap includes a proximal end and a distal end.

The stripper plate system includes a first tensioning mechanism mounted at or near the proximal end of the first stripper plate and biasing the proximal end of the first stripper plate toward a center of the elongated gap. The stripper plate system includes a second tensioning mechanism mounted at or near the distal end of the first stripper plate and biasing the distal end of the first stripper plate toward the center of the elongated gap. The stripper plate system includes a third tensioning mechanism mounted at or near the proximal end of the second stripper plate and biasing the proximal end of the second stripper plate toward the center of the elongated gap. The stripper plate system includes a fourth tensioning mechanism mounted at or near the distal end of the second stripper plate and biasing the distal end of the second stripper plate toward the center of the elongated gap.

A biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates. The first and second stripper plates are configured to move laterally upon contact with a crop. The harvester can include a conveyor system including a first conveyor disposed above the first stripper plate and a second conveyor disposed above the second stripper plate. The first and second conveyors can be configured to direct the crop from the proximal end to the distal end of the elongated gap. The harvester can include a roll system including a first roll rotatably disposed below the first stripper plate and a second roll rotatably disposed below the second stripper plate. The harvester can include a processing system configured to process crop introduced into the processing system from the roll system.

The first and second stripper plates can be configured to move laterally relative to the frame independently of each other. The proximal end of the first stripper plate can be configured to move laterally relative to the frame independently of the distal end of the first stripper plate. The proximal end of the second stripper plate can be configured to move laterally relative to the frame independently of the distal end of the second stripper plate. In a first operative mode, introduction of the crop into the elongated gap at the proximal end of the first and second stripper plates moves the first and second stripper plates laterally at the proximal ends to accommodate a diameter of the crop.

The first lateral side of the first and second stripper plates can define an outwardly tapering section at the proximal end of the first and second stripper plates. The outwardly tapering section at the proximal end of the first and second stripper plates forms a proximal gap distance dimensioned greater than a distal gap distance. In one embodiment, the first, second, third and fourth tensioning mechanism comprise at least one of a rubber bushing, a pull spring, a torsion spring, or a compression spring (or combinations thereof). In one embodiment, the first conveyor and the second conveyor each include one or a plurality of chains. In one embodiment, the first conveyor and the second conveyor each include one or a plurality of belts.

In accordance with embodiments of the present disclosure, an exemplary method of operating a harvester header (or a method of harvesting) is provided. The method includes introducing crop into a stripper plate system. The stripper plate system includes a first stripper plate movably mounted to a frame. The first stripper plate includes an elongated body with a proximal end, a distal end, a first lateral side, and a second lateral side. The stripper plate system includes a second stripper plate movably mounted to the frame in an opposing orientation to the first stripper plate. The second stripper plate includes an elongated body with a proximal end, a distal end, a first lateral side, and a second lateral side. The second stripper plate is movably mounted to the frame such that the first lateral side of the second stripper plate faces the first lateral side of the first stripper plate and forms an elongated gap between the first and second stripper plates. The elongated gap includes a proximal end and a distal end.

The method includes biasing the proximal end of the first stripper plate toward a center of the elongated gap with a first tensioning mechanism mounted at or near the proximal end of the first stripper plate. The method includes biasing the distal end of the first stripper plate toward the center of the elongated gap with a second tensioning mechanism mounted at or near the distal end of the first stripper plate. The method includes biasing the proximal end of the second stripper plate toward a center of the elongated gap with a third tensioning mechanism mounted at or near the proximal end of the second stripper plate. The method includes biasing the distal end of the second stripper plate toward the center of the elongated gap with a fourth tensioning mechanism mounted at or near the distal end of the second stripper plate.

The method includes moving the first and second stripper plates laterally upon contact with the crop. The method includes directing the crop from the proximal end to the distal end of the elongated gap with a conveyor system including a first conveyor disposed above the first stripper plate and a second conveyor disposed above the second stripper plate. A biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates. The method includes laterally moving the first and second stripper plates relative to the frame independently of each other. The method includes rotating the first and second conveyors in opposing directions.

In accordance with embodiments of the present disclosure, an exemplary method of operating a harvester (or a method of harvesting) is provided. The method includes introducing crop into a stripper plate system. The stripper plate system includes a first stripper plate movably mounted to a frame. The first stripper plate includes an elongated body with a proximal end, a distal end, a first lateral side, and a second lateral side. The stripper plate system includes a second stripper plate movably mounted to the frame in an opposing orientation to the first stripper plate. The second stripper plate includes an elongated body with a proximal end, a distal end, a first lateral side, and a second lateral side.

The second stripper plate is movably mounted to the frame such that the first lateral side of the second stripper plate faces the first lateral side of the first stripper plate and forms an elongated gap between the first and second stripper plates. The elongated gap includes a proximal end and a distal end.

The method includes biasing the proximal end of the first stripper plate toward a center of the elongated gap with a first tensioning mechanism mounted at or near the proximal end of the first stripper plate. The method includes biasing the distal end of the first stripper plate toward the center of the elongated gap with a second tensioning mechanism mounted at or near the distal end of the first stripper plate. The method includes biasing the proximal end of the second stripper plate toward a center of the elongated gap with a third tensioning mechanism mounted at or near the proximal end of the second stripper plate. The method includes biasing the distal end of the second stripper plate toward the center of the elongated gap with a fourth tensioning mechanism mounted at or near the distal end of the second stripper plate.

The method includes moving the first and second stripper plates laterally upon contact with the crop. The method includes directing the crop from the proximal end to the distal end of the elongated gap with a conveyor system including a first conveyor disposed above the first stripper plate and a second conveyor disposed above the second stripper plate. The method includes rotating a first roll and a second roll of a roll system. The first roll can be below the first stripper plate and the second roll can be below the second stripper plate. The method includes processing the crop introduced into a processing system from the roll system. A biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates. The method includes laterally moving the first and second stripper plates relative to the frame independently of each other. The method includes rotating the first and second conveyors in opposing directions.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed stripper plate systems, reference is made to the accompanying figures, wherein.

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

Figure 1:
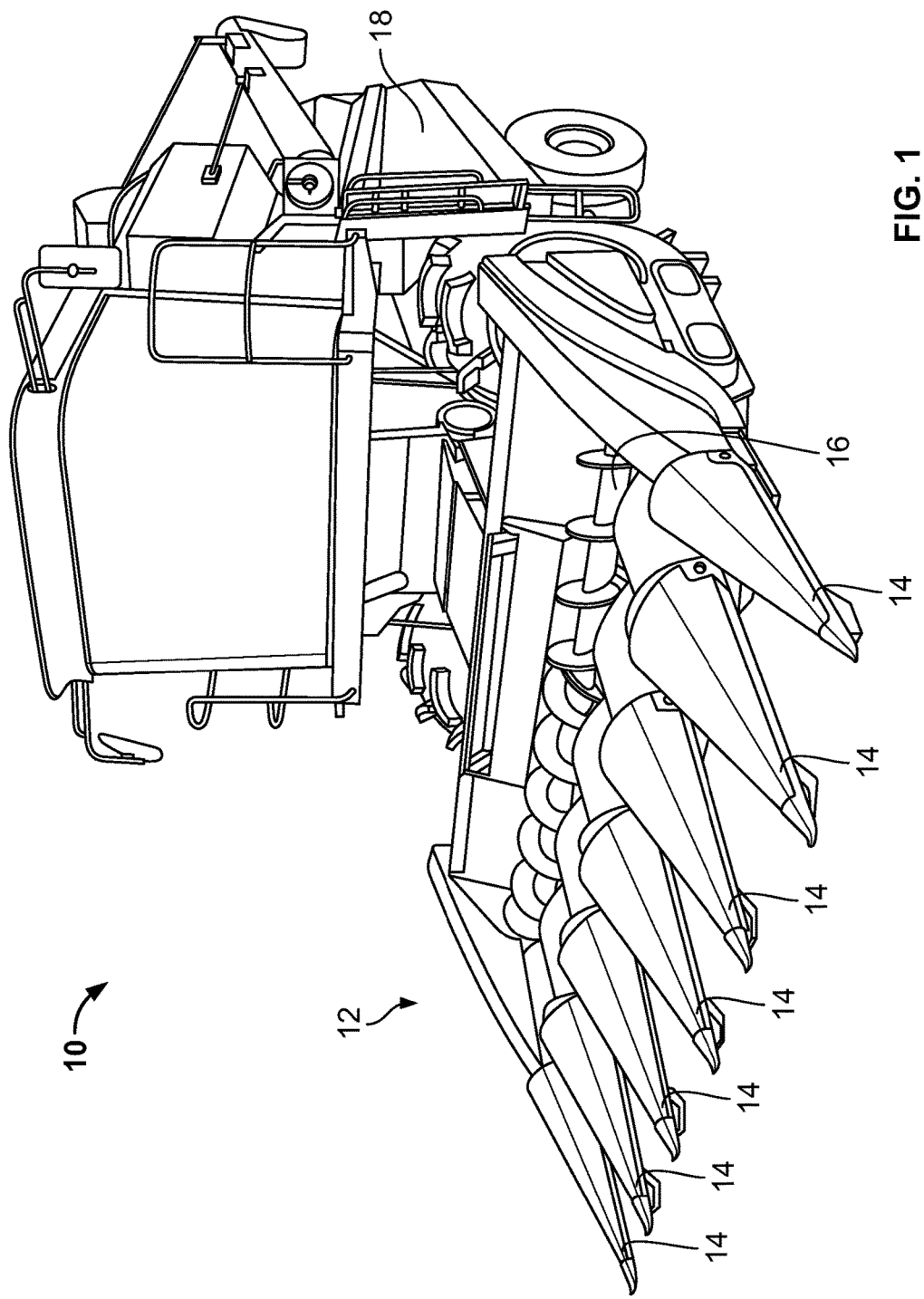
FIG. 1 is a perspective view of a traditional harvester including a header.
Figure 2:
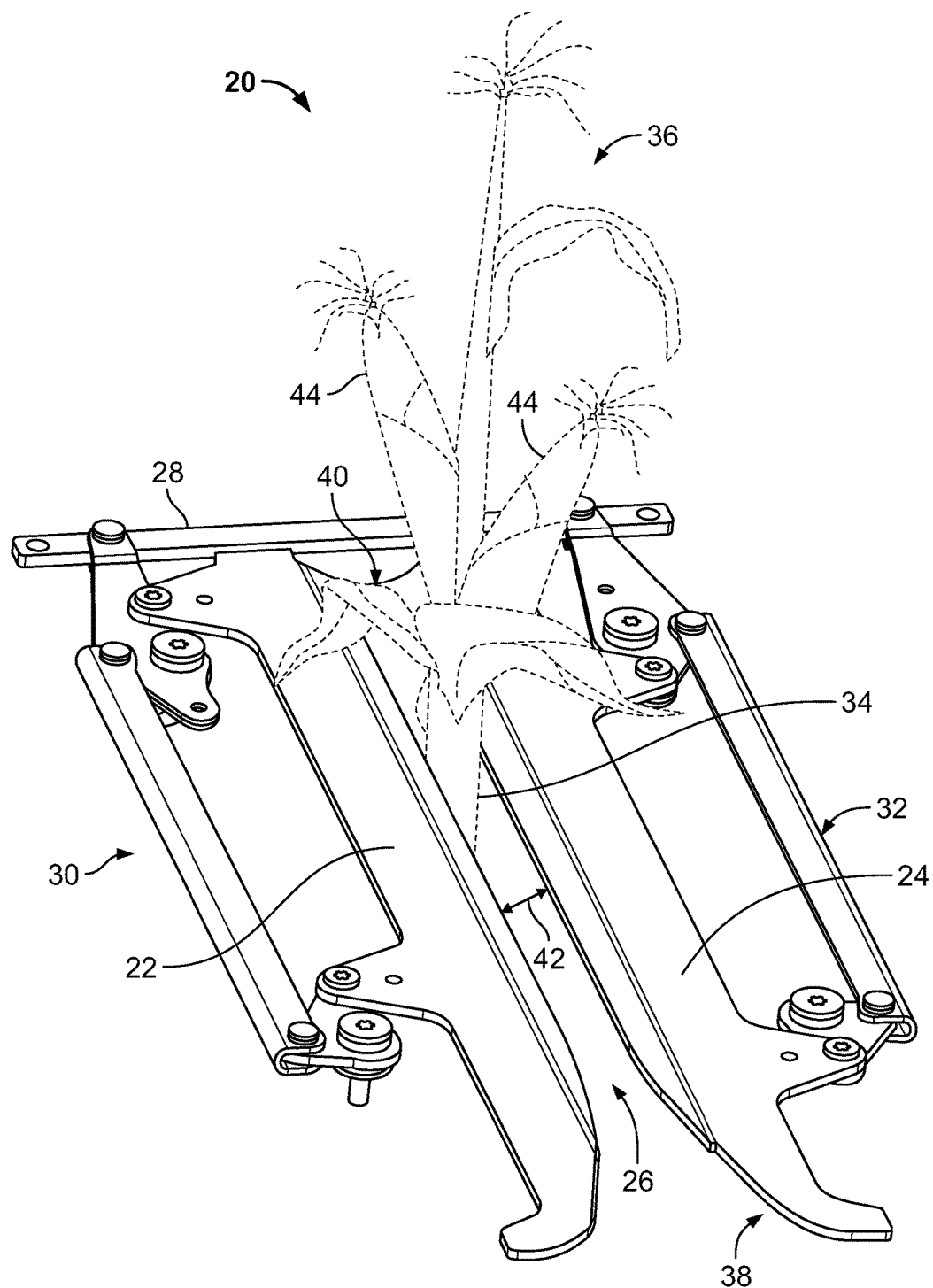
FIG. 2 is a detailed, perspective view of a traditional stripper plate system of a harvester.
Figure 3:
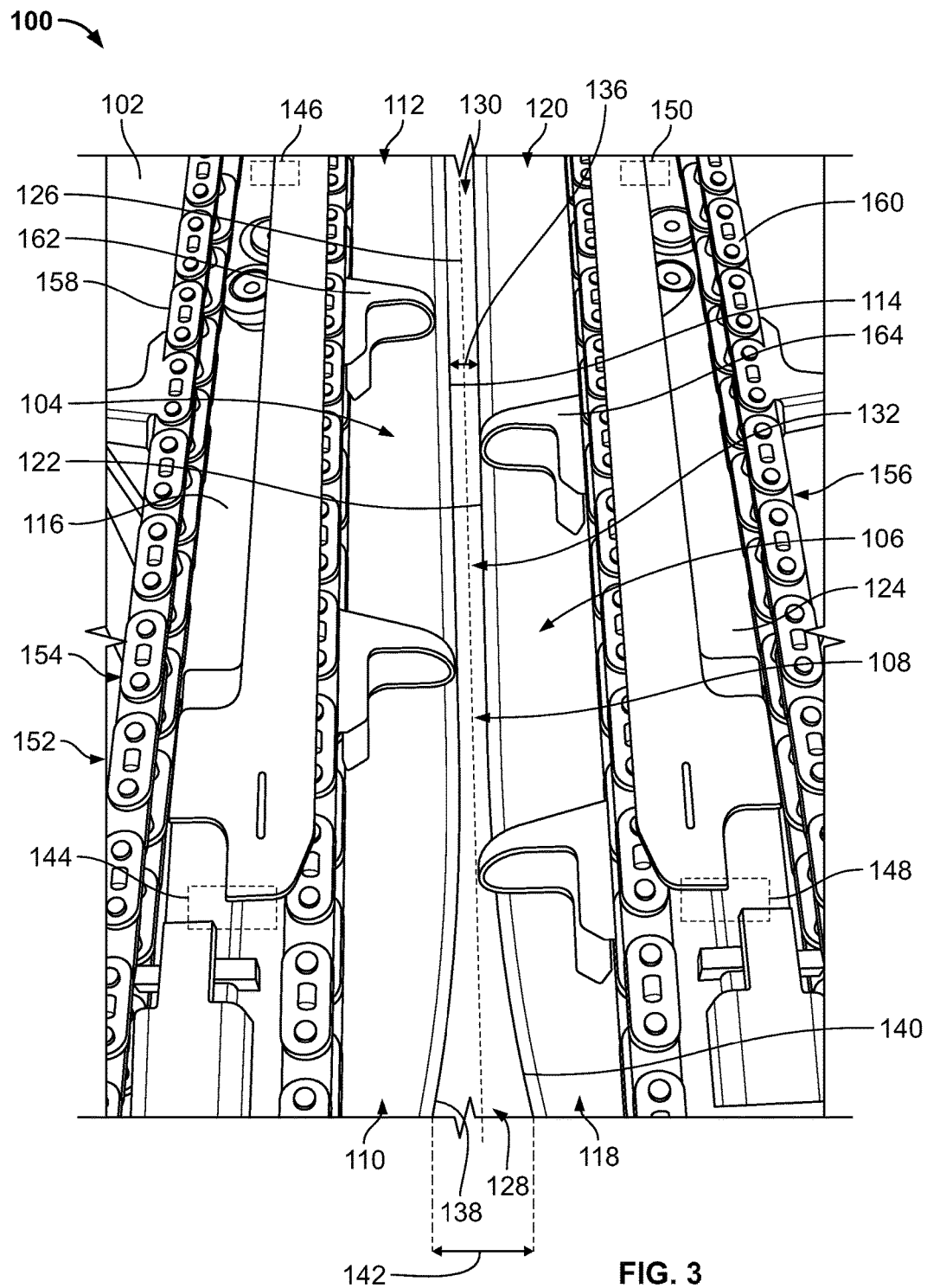
FIG. 3 is a front view of an exemplary stripper plate system of the present disclosure.

FIG. 3 shows a front view of an exemplary stripper plate system 100 (hereinafter "system 100"). The system 100 can be used with any type of header or harvester, such as for example, header 12 or harvester 10 of FIG. 1. The system 100 includes a frame 102, a first stripper plate 104, and a second stripper plate 106. The first stripper plate 104 is movably mounted to the frame 102 such that the first stripper plate 104 can move substantially laterally relative to the system 100 upon contact with stalk of a corn plant. The second stripper plate 106 is movably mounted to the frame 102 in an opposing and spaced orientation to the first stripper plate 104, thereby forming an elongated gap 108 between the first and second stripper plates 104, 106.

The first stripper plate 104 includes an elongated body with a proximal end 110 (e.g., a leading edge), a distal end 112, a first lateral side 114 (e.g., an inwardly directed side configured to be in contact with the stalk), and a second lateral side 116. The second stripper plate 106 also includes an elongated body with a proximal end 118, a distal end 120, a first lateral side 122 (e.g., an inwardly directed side configured to be in contact with the stalk), and a second lateral side 124. The edges of the first lateral sides 114, 122 can be rounded to prevent shearing of the stalk when the first lateral sides 114, 122 are biased against the stalk.

The first and second stripper plates 104, 106 are mounted in an opposing and mirror image type configuration with the first lateral sides 114, 122 facing each other. In the normal configuration, the first lateral sides 114, 122 can be substantially equally spaced from a center of the elongated gap 108 defined by a central longitudinal axis 126. The elongated gap 108 includes a proximal end 128, a distal end 130, and a middle area or midpoint 132 between the proximal and distal ends 128, 130. The elongated gap 108 therefore extends the entire length between the first and second stripper plates 104, 106. As the system 100 engages corn plants in the field, the stalk can enter the elongated gap 108 at the proximal end 128, travel between the first and second stripper plates 104, 106 to the distal end 130, and is pulled downwardly by a stalk roll system 134 (see, e.g., FIG. 5).

In the normal or disengaged configuration shown in FIG. 3, the first and second stripper plates 104, 106 are not engaged with a corn plant. In such configuration, a width or distance 136 of the elongated gap 108 as measured between the first lateral sides 114, 122 is substantially uniform (e.g., about 20 mm). In some embodiments, the distance 136 can be between about 15 mm and about 35 mm to accommodate stalk widths of different sizes. In some embodiments, the proximal ends 110, 118 of the first and second stripper plates 104, 106 can include tapering sections 138, 140 that curve outwardly away from each other. In such embodiments, the proximal gap distance 142 can be dimensioned greater than the distance 136, which represents the width of the elongated gap 108 between the first lateral sides 114, 122 at the points distal from the tapered sections 138, 140. In one embodiment, the proximal gap distance 142 can be about 52 mm and the distance 136 can be about 20 mm. The greater distance 142 formed by the tapered sections 138, 140 provides a greater clearance to assist in guiding stalks into the elongated gap 108. For example, stalks that are not perfectly aligned with the elongated gap 108 as the harvester travels across a field can be guided into the elongated gap 108 after entering the tapered sections 138, 140.

The system 100 includes tensioning mechanisms that allow for independent lateral movement of the first and second stripper plates 104, 106 at the proximal 110, 118 and distal ends 112, 120. The tensioning mechanisms can be any type of mechanism that provides a biasing force to the first and second stripper plates 104, 106 without the use of electronic sensors or controllers, e.g., a rubber bushing, a pull spring, a torsion spring, a compression spring, a mini gas strut, a rubber spring, combinations thereof, or the like.

In particular, the system 100 includes a first tensioning mechanism 144 mounted at or near the proximal end 110 of the first stripper plate 104 and movably coupling the first stripper plate 104 to the frame 102. In some embodiments, the first tensioning mechanism 144 can be mounted to a top surface of the first stripper plate 104 between the first and second lateral sides 114, 116. In some embodiments, the first tensioning mechanism 144 can be mounted to the second lateral side 114. The first tensioning mechanism 144 biases the proximal end 110 of the first stripper plate 104 toward the central axis 126 of the elongated gap 108 (e.g., towards the second stripper plate 106) independently from the distal end 112 of the first stripper plate 104. The system 100 can include one or more linkages that mechanically couple the proximal end 110 of the first stripper plate 104 to the frame 102, and the first tensioning mechanism 144 can be used to provide the biasing force on the first stripper plate 104.

The system 100 includes a second tensioning mechanism 146 mounted at or near the distal end 112 of the first stripper plate 104 and movably coupling the first stripper plate 104 to the frame 102. In some embodiments, the second tensioning mechanism 146 can be mounted to a top surface of the first stripper plate 104 between the first and second lateral sides 114, 116. In some embodiments, the second tensioning mechanism 146 can be mounted to the second lateral side 114. The second tensioning mechanism 146 biases the distal end 112 of the first stripper plate 104 toward the central axis 126 of the elongated gap 108 independently from the proximal end 110 of the first stripper plate 104. The system 100 can include one or more linkages that mechanically couple the distal end 112 of the first stripper plate 104 to the frame 102, and the second tensioning mechanism 144 can be used to provide the biasing force on the first stripper plate 104.

The system 100 further includes third and fourth tensioning mechanisms 148, 150 associated with the second stripper plate 106 that function in a substantially similar manner as the first and second tensioning mechanisms 144, 146. In particular, third tensioning mechanism 148 can be mounted at or near the proximal end 112 of the second stripper plate 106 and movably couples the second stripper plate 106 to the frame 102. In some embodiments, the second tensioning mechanism 148 can be mounted to a top surface of the second stripper plate 106 between the first and second lateral sides 122, 124. In some embodiments, the third tensioning mechanism 148 can be mounted to the second lateral side 124. The third tensioning mechanism 148 biases the proximal end 118 of the second stripper plate 106 toward the central axis 126 of the elongated gap 108 (e.g., towards the first stripper plate 104) independently from the distal end 120 of the second stripper plate 106. The system 100 can include one or more linkages that mechanically couple the proximal end 118 of the second stripper plate 106 to the frame 102, and the third tensioning mechanism 148 can be used to provide the biasing force on the second stripper plate 106.

The fourth tensioning mechanism 150 can be mounted at or near the distal end 120 of the second stripper plate 106 and movably couples the second stripper plate 106 to the frame 102. In some embodiments, the fourth tensioning mechanism 150 can be mounted to a top surface of the second stripper plate 106 between the first and second lateral sides 122, 124. In some embodiments, the fourth tensioning mechanism 150 can be mounted to the second lateral side 124. The fourth tensioning mechanism 150 biases the distal end 120 of the second stripper plate 106 toward the central axis 126 of the elongated gap 108 independently from the proximal end 118 of the second stripper plate 106. The system 100 can include one or more linkages that mechanically couple the distal end 120 of the second stripper plate 106 to the frame 102, and the fourth tensioning mechanism 150 can be used to provide the biasing force on the second stripper plate 106.

The tensioning mechanisms 144-150 are selected such that the biasing force of the first and third tensioning mechanisms 144, 148 is lower than a biasing force of the second and fourth tensioning mechanisms 146, 150. In particular, the first and third tensioning mechanisms 144, 148 are different from the second and fourth tensioning mechanisms. The first and third tensioning mechanisms 144, 148 can have a biasing force of substantially the same value, and the second and fourth tensioning mechanisms 146, 150 can have a biasing force of substantially the same value. For example, springs with a high stiffness (e.g., a high spring constant) can be selected for the second and fourth tensioning mechanism 146, 150, and springs with a low stiffness (e.g., a low spring constant) can be selected for the first and third tensioning mechanisms 144, 148. A lower biasing force is thereby imparted at the proximal ends 110, 118 of the first and second stripper plates 104, 106 than the biasing force imparted at the distal ends 112, 120 of the first and second stripper plates 104, 106.

Upon contact with stalk introduced into the elongated gap 108 at the proximal end 128, the first and second stripper plates 104, 106 can be laterally biased away from each other by the stalk to accommodate the size (e.g., diameter) of the stalk. In particular, the tensioning mechanisms 144-150 allow the first and second stripper plates 104, 106 to move laterally relative to the frame 102 independently of each other. In addition, the proximal end 110 of the first stripper plate 104 can move laterally relative to the frame 102 independently of the distal end 112 of the first stripper plate 104 (and vice versa). Thus, as the proximal end 110 is moved laterally relative to the frame 102, the distal end 112 can pivot at a substantially vertical pivot axis located at or adjacent to the second tensioning mechanism 146. Conversely, as the distal end 112 is moved laterally relative to the frame 102, the proximal end 110 can pivot at a substantially vertical pivot axis located at or adjacent to the first tensioning mechanism 144.

Similarly, the proximal end 118 of the second stripper plate 106 can move laterally relative to the frame 102 independently of the distal end 120 of the second stripper plate 106 (and vice versa). Thus, as the proximal end 118 is moved laterally relative to the frame 102, the distal end 120 can pivot at a substantially vertical pivot axis located at or adjacent to the fourth tensioning mechanism 150. Conversely, as the distal end 120 is moved laterally relative to the frame 102, the proximal end 118 can pivot at a substantially vertical pivot axis located at or adjacent to the third tensioning mechanism 148. The proximal ends 110, 118 can therefore be biased to move laterally independently from the distal ends 112, 120, and vice versa.

Therefore, as the stalk enters the elongated gap 108 at the proximal end 128, the proximal ends 110, 118 of the first and second stripper plates 104, 106 are biased to move laterally away from each other to accommodate the size of the stalk (resulting in an increase of the distance 142), while the distance 136 at the distal ends 112, 120 remains substantially unchanged or unaffected. As the stalk travels along the elongated gap 108 towards the midpoint 132 of the elongated gap 108, the distance 136 at the midpoint 132 increases due to lateral movement of the first and second stripper plates 104, 106 to accommodate the stalk at the midpoint 132, while the distance 142 decreases. As the stalk travels further along the elongated gap 108 to the distal end 130, the distal ends 112, 120 of the first and second stripper plates 104, 106 can be biased to move laterally away from each other to accommodate the size of the stalk (resulting in an increase of the distance 136), while the distance 142 decreases further.

The decreased distance 142 allows the proximal ends 110, 118 to accommodate a subsequent stalk of the same or different size and ensures that the distance 136 of the elongated gap 108 is not wider than the stalk diameter. With the independent biasing of the first and second stripper plates 104, 106 at the respective proximal ends 110, 118 and distal ends 112, 120, a substantially constant pressure can be maintained on the stalk with the first lateral sides 114, 122. Wedging of ears of corn between the first and second lateral plates 104, 106 and/or passage of ears of corn through the elongated gap 108 due to an elongated gap 108 that is too wide can thereby be prevented.

The system 100 includes a conveyor system 152 configured to assist in moving the corn plant from the proximal end 128 to the distal end 130 of the elongated gap 108. The conveyor system 152 can further assist in urging ears of corn separated from the stalks toward the distal end 130 and into the auger 16. The conveyor system 152 includes a first conveyor 154 disposed substantially above the first stripper plate 104 and a second conveyor 156 disposed substantially above the second stripper plate 106.

The first and second conveyors 154, 156 each include a driving element 158, 160 (e.g., a belt, chain, or the like) looped around rollers such that the driving elements 158, 160 can be rotated over the respective first and second stripper plates 104, 106. Each driving element 158, 160 includes a plurality of urging elements 162, 164 spaced along the length of the driving element 158, 160. The first and second conveyors 154, 156 rotate in opposing directions. In particular, the driving element 158 rotates in a counterclockwise direction and the driving element 160 rotates in a clockwise direction. Due to the looped route of the driving elements 158, 160, as the first and second conveyors 154, 156 continuously rotate in their respective directions, the urging elements 162, 164 travel from the proximal ends 110, 118, over the respective first and second stripper plates 104, 106 to the distal end 130, loop around the outer sides of the system 100, and return to the proximal ends 110, 118.

The urging elements 162, 164 can extend from the driving elements 158, 160 over the respective first and second stripper plates 104, 106 without extending over the elongated gap 108. The urging elements 162, 164 on the first and second conveyors 154, 156 can be staggered as shown in FIG. 3, such that the urging elements 162, 164 are never positioned adjacent to each other. As the corn plant enters the elongated gap 108, the urging elements 162, 164 can impart force on elements of the corn plant (e.g., the stalk, husks, combinations thereof, or the like) to urge the corn plant towards the distal end 130.

Figure 5:
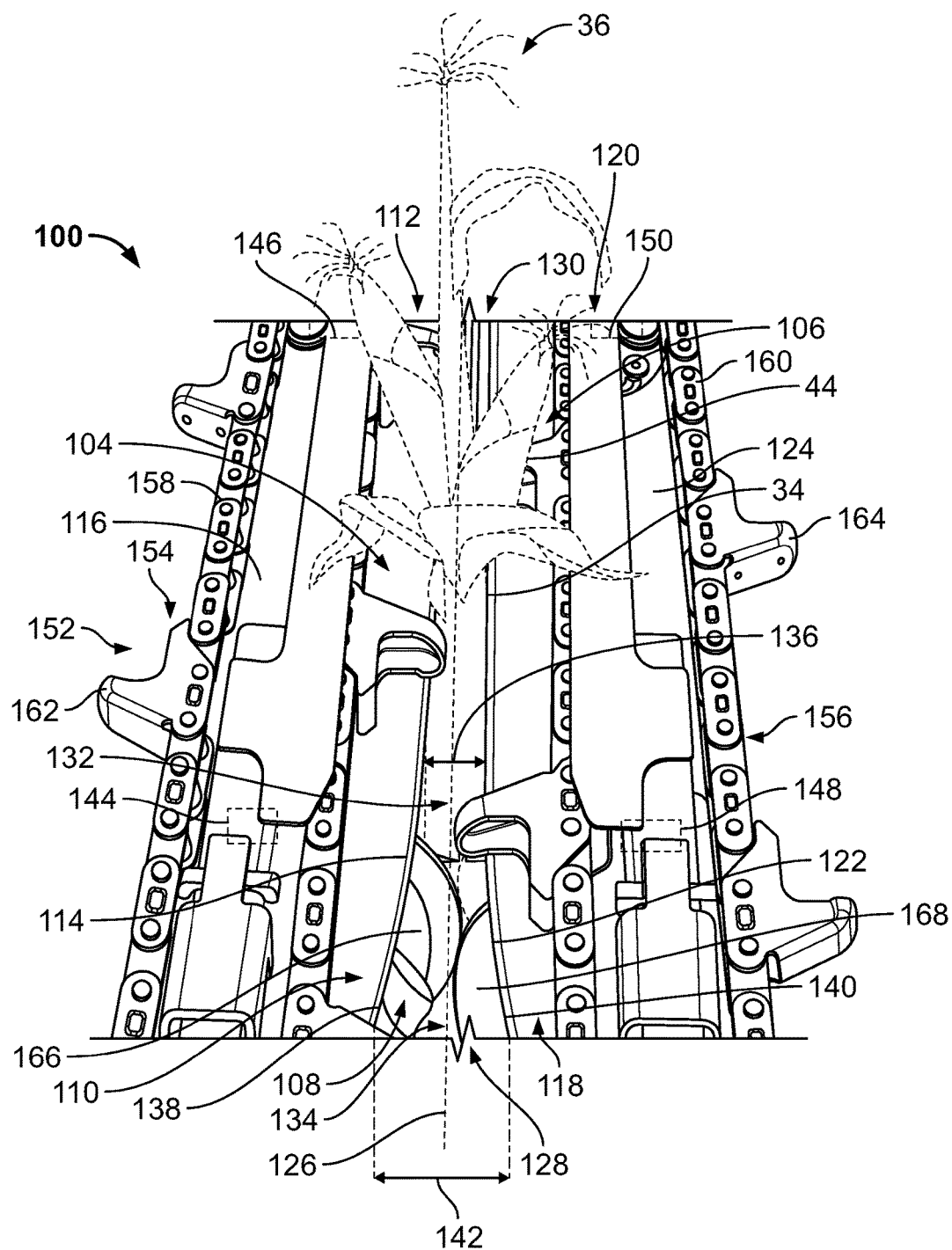
FIG. 5 is a front view of an exemplary stripper plate system of the present disclosure including a corn stalk at a midpoint of an elongated gap.

As shown in FIG. 5, the system 100 includes a stalk roll system 134 disposed below the first and second stripper plates 104, 106. The stalk roll system 134 includes a first roll 166 disposed substantially below the first stripper plate 104 and at least partially extending below the elongated gap 108. The stalk roll system 134 includes a second droll 168 disposed substantially below the second stripper plate 106 and at least partially extending below the elongated gap 108. The first and second rolls 166, 168 can be positioned laterally adjacent to each other and can define substantially cylindrical configurations with central longitudinal axes about which the first and second rolls 166, 168 rotate extending substantially parallel to the first and second stripper plates 104, 106. The central longitudinal axes of the first and second rolls 166, 168 can be substantially parallel to each other, and can be disposed substantially perpendicularly relative to the lateral direction of movement of the first and second stripper plates 104, 106.

The first and second rolls 166, 168 rotate in opposing directions. For example, the first roll 166 can rotate in a clockwise direction and the second roll 168 can rotate in a counterclockwise direction. In one embodiment, the first and second rolls 166, 168 can include radial channels and/or protrusions (e.g., spirals) configured to grip the stalk and urge the stalk towards the distal end 130. In one embodiment, the first and second rolls 166, 168 can be in the form of augers. Thus, as the stalk is introduced into the elongated gap 108, the conveyor system 152 and the stalk roll system 134 can work in combination to transfer the stalk towards the distal end 130 where the stalk can be pulled downward to separate the ears from the stalk. The higher biasing force at the distal ends 112, 120 ensures that the force imparted on the stalk is sufficient to prevent the ears from passing through the elongated gap 108 when the stalk is pulled downwardly.

Figure 4:
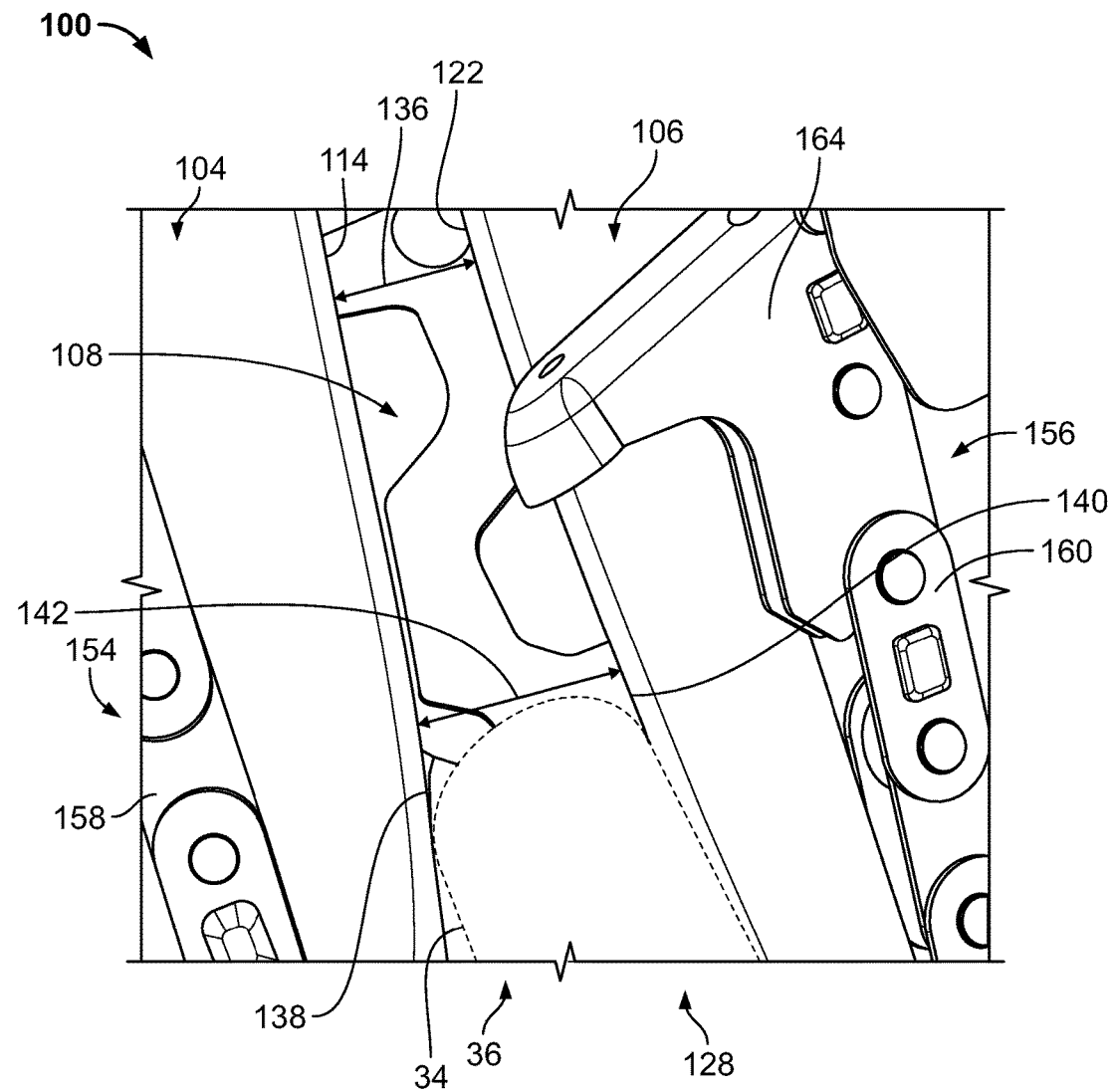
FIG. 4 is a detailed, top view of an exemplary stripper plate system of the present disclosure including a corn stalk at a proximal end of an elongated gap.

FIG. 4 shows a detailed, top view of the system 100 with the stalk 34 positioned at the proximal end 128 of the elongated gap 108. In particular, FIG. 4 shows the moment at which the stalk 34 contacts the tapered sections 138, 140 of the first and second stripper plates 104, 106 prior to laterally urging the first and second stripper plates 104, 106 away from each other. The distances 136, 142 are therefore shown in the normal position. Upon contact with the stalk 34, the first and second stripper plates 104, 106 can be urged laterally outward due to the force imparted by the stalk 34. As noted above, the tapered sections 138, 140 assist in guiding the stalk 34 into the elongated gap 108.

FIG. 5 shows a front view of the system 100 with the stalk 34 positioned at or near the midpoint 132 of the elongated gap 108. In particular, as the stalk 34 moves from the proximal end 128 to the midpoint 132, the first and second stripper plates 104, 106 are urged laterally outward at the proximal ends 110, 118 to increase the distance 136 at the midpoint 132. Due to the independent biasing of the proximal ends 110, 118 and distal ends 112, 120 of the first and second stripper plates 104, 106, increase of the distance 136 at the midpoint 132 does not simultaneously increase the distance 136 at the distal end 130. Specifically, the distance 136 tapers from the proximal end 128 to the distal end 130. Contact between the first lateral sides 114, 122 and the stalk 34 can therefore be maintained.

Figure 6:
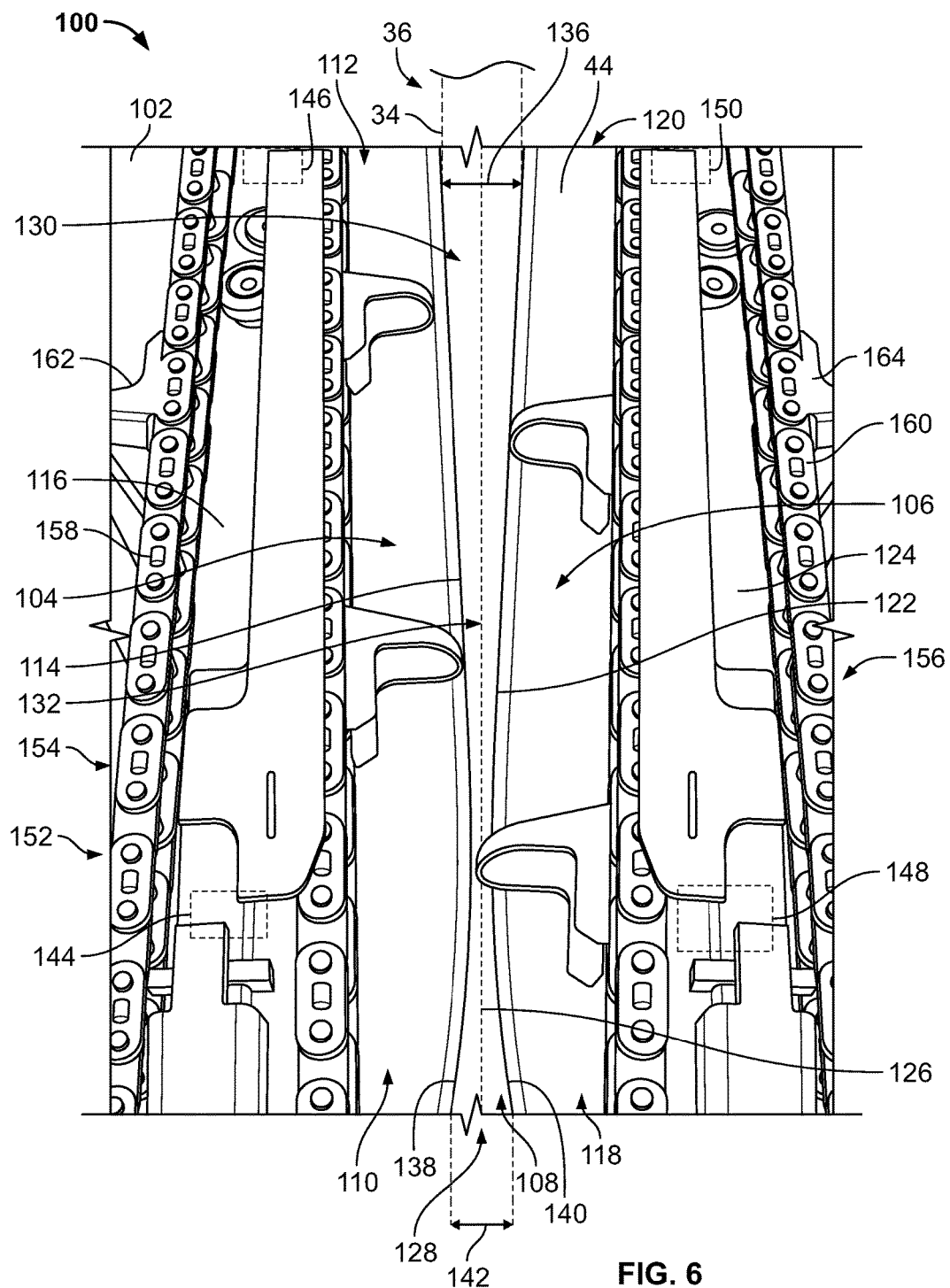
FIG. 6 is a front view of an exemplary stripper plate system of the present disclosure including a corn stalk at a distal end of an elongated gap.

FIG. 6 shows a front view of the system 100 with the stalk 34 positioned at or near the distal end 130 of the elongated gap 108. In particular, as the stalk 34 moves from the midpoint 132 to the distal end 130, the first and second stripper plates 104, 106 are urged laterally outward at the distal ends 112, 120 to increase the distance 136 at the distal end 130. Due to the independent biasing of the proximal ends 110, 118 and distal ends 112, 120 of the first and second stripper plates 104, 106, increase of the distance 136 at the distal end 130 does not simultaneously increase the distance 136 at the proximal end 128 or the midpoint 132.

Specifically, as the stalk 34 moves toward the distal end 130, the distance 136 increases at the distal end 130 and decreases at the midpoint 132. Contact between the first lateral sides 114, 122 and the stalk 34 can therefore be maintained without increasing the distance 136 at the proximal end 128. The distance 136 at the proximal end 128 can be adjusted to accommodate a subsequent stalk 34 entering the elongated gap 108 without increasing or decreasing the distance 136 at the distal end 130.

Figure 7:
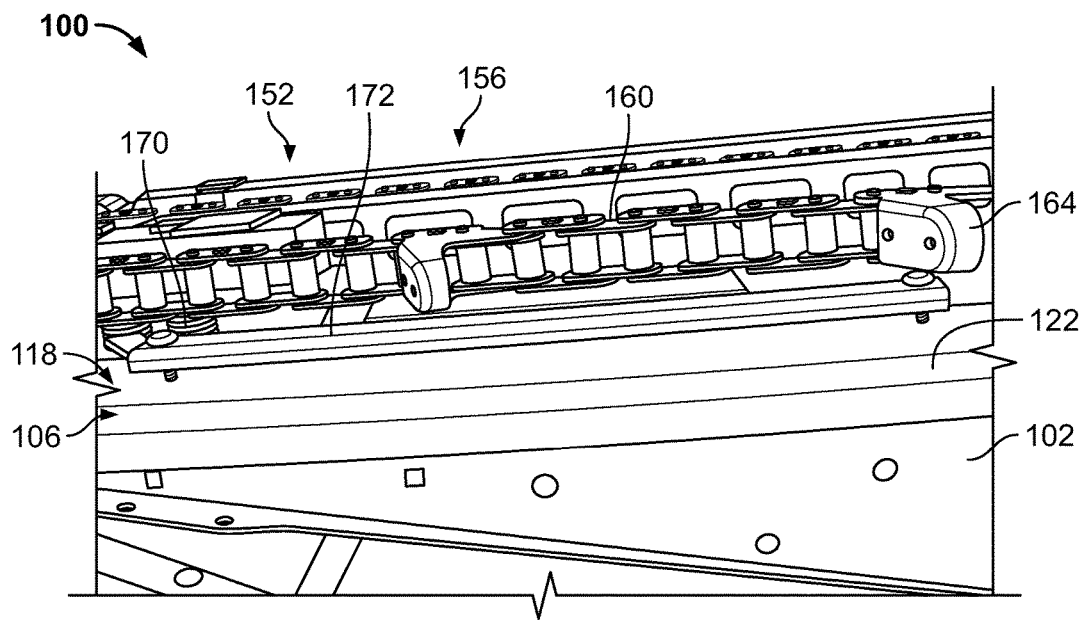
FIG. 7 is a detailed side view of an exemplary stripper plate system of the present disclosure including a tensioning mechanism in the form of a spring.
Figure 8:
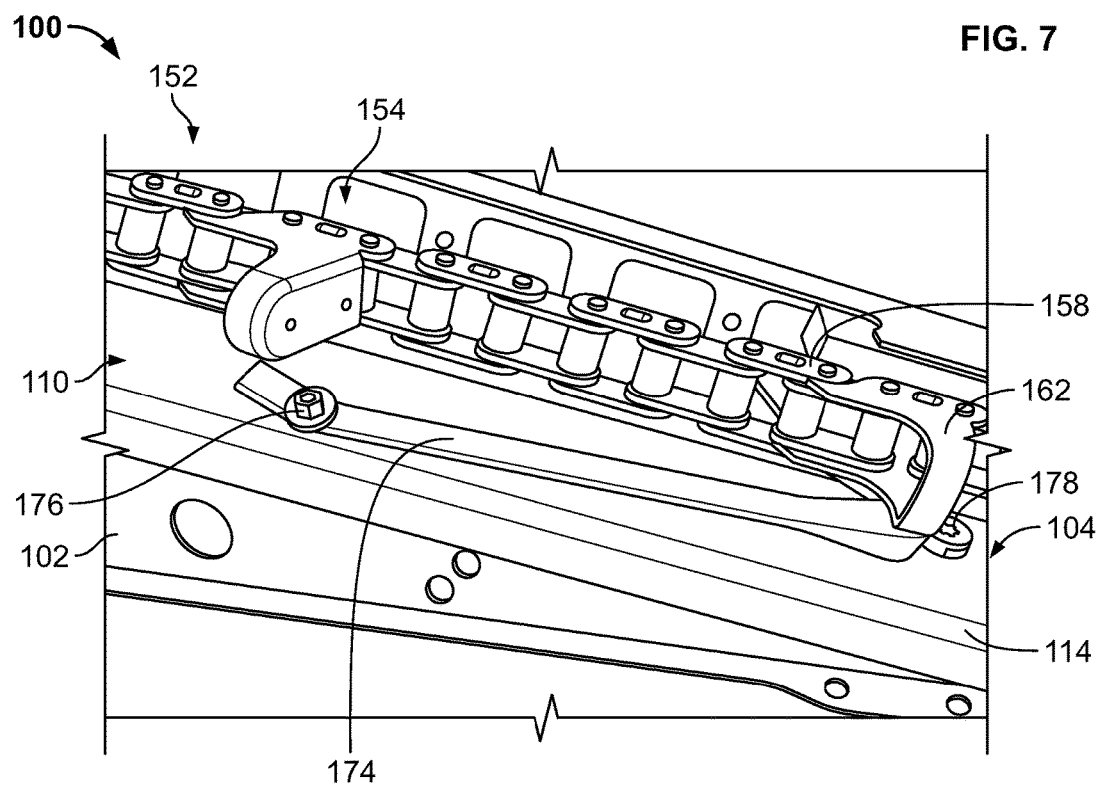
FIG. 8 is a detailed side view of an exemplary stripper plate system of the present disclosure including a tensioning mechanism in the form of a rubber spring.
Figure 9:
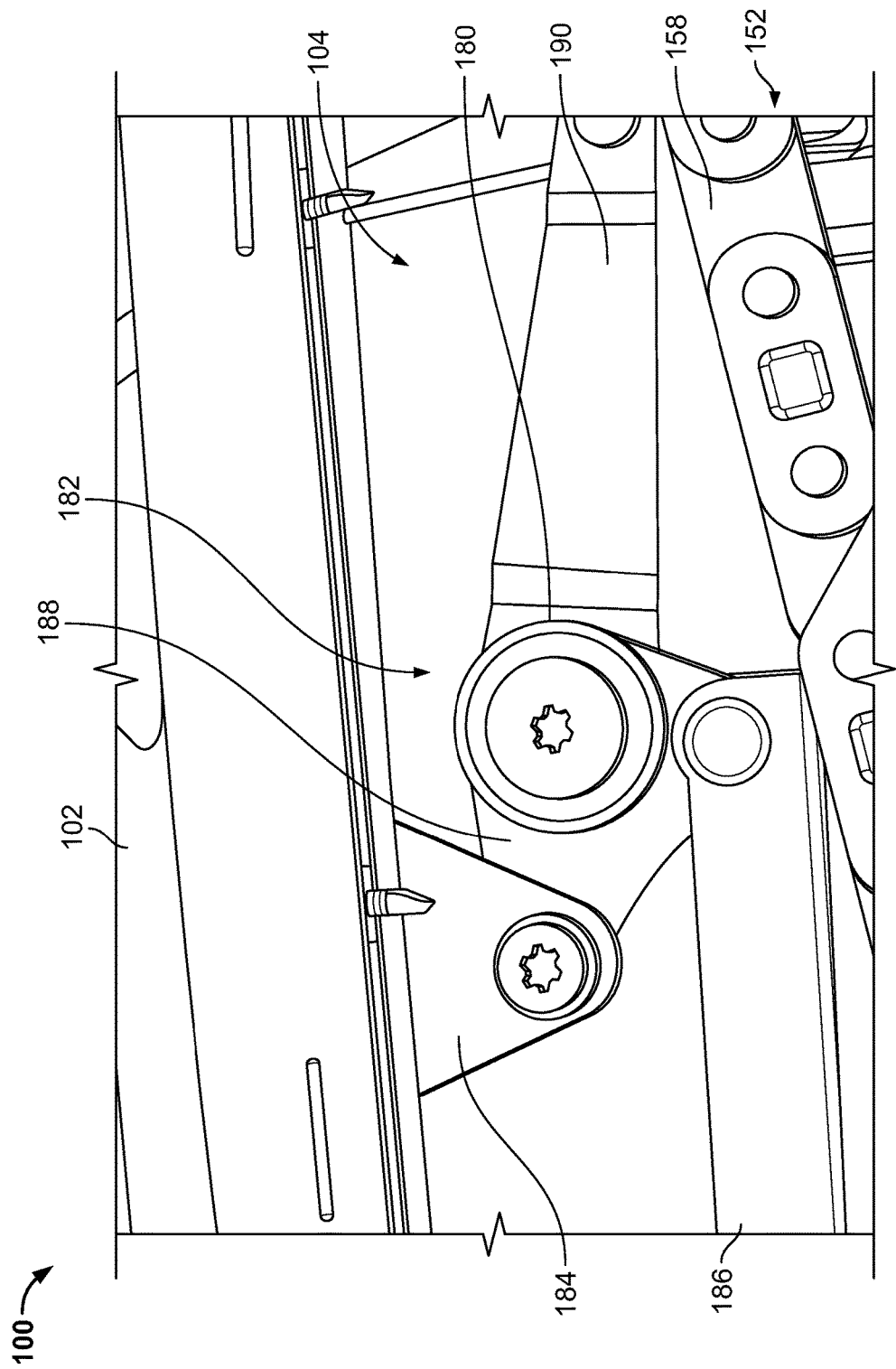
FIG. 9 is a detailed top view of an exemplary stripper plate system of the present disclosure including a tensioning mechanism in the form of a torsion bushing.

FIGS. 7-9 show detailed views of alternative types of tensioning mechanisms that can be used in the system 100. Although illustrated in a particular location and stripper plate, it should be understood that the tensioning mechanisms can be used as the first, second, third or fourth tensioning mechanism 144-150 with the stiffness selected such that the first and third tensioning mechanisms 144, 148 have a lower stiffness than the second and fourth tensioning mechanisms 146, 150.

FIG. 7 shows a detailed view of the proximal end 118 of the second stripper plate 106 with the third tensioning mechanism 148 in the form of a spring 170. The spring 170 can be incorporated into the linkages 172 connecting the second stripper plate 106 to the frame 102 with the spring 170 providing a biasing force to the second stripper plate 106.

FIG. 8 shows a detailed view of the proximal end 110 of the first stripper plate 104 with the first tensioning mechanism 144 in the form of a rubber spring 174. The rubber spring 174 can be coupled to the first stripper plate 104 with a fastening element 176 at one end, and can be coupled to a linkage 178 at an opposing end. The linkage 178 further couples the first stripper plate 104 to the frame 102. The rubber spring 174 therefore provides a biasing force to the first stripper plate 104.

FIG. 9 shows a detailed top view of the first stripper plate 104 with the first tensioning mechanisms 144 in the form of a torsion bushing 180. The torsion bushing 180 can be incorporated into a linkage system 182 including two or more linkages 184-190 that couple the first stripper plate 104 to the frame 102. The torsion bushing 180 provides a biasing force on the linkage system 182 which, in turn, provides a biasing force on the first stripper plate 104.

The exemplary system therefore includes tensioning mechanisms that provide different levels of a biasing force at the proximal and distal ends of the first and second stripper plates. The first and second stripper plates move laterally independently of each other. In addition, the proximal and distal ends of the individual stripper plates move laterally independently of each other. The elongated gap between the stripper plates can therefore be maintained at a minimal, varied distance along the length of the elongated gap (e.g., not a constant distance between the stripper plates) to ensure substantially constant force is imparted on the stalk as it moves from the proximal end to the distal end of the elongated gap. The system accomplishes these features in a cost effective manner without the incorporation of electronic sensors or controllers for actuating the stripper plates.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A stripper plate system, comprising:
a frame;
a first stripper plate movably mounted to the frame, the first stripper plate comprising an elongated body with a proximal end, a distal end, a first lateral side, and a second lateral side;
a second stripper plate movably mounted to the frame in an opposing orientation to the first stripper plate, the second stripper plate comprising an elongated body with a proximal end, a distal end, a first lateral side, and a second lateral side, the second stripper plate being movably mounted to the frame such that the first lateral side of the second stripper plate faces the first lateral side of the first stripper plate and forms an elongated gap between the first and second stripper plates, and the elongated gap comprises a proximal end and a distal end;
a first tensioning mechanism mounted at or near the proximal end of the first stripper plate and biasing the proximal end of the first stripper plate toward a center of the elongated gap;
a second tensioning mechanism mounted at or near the distal end of the first stripper plate and biasing the distal end of the first stripper plate toward the center of the elongated gap;
a third tensioning mechanism mounted at or near the proximal end of the second stripper plate and biasing the proximal end of the second stripper plate toward the center of the elongated gap; and
a fourth tensioning mechanism mounted at or near the distal end of the second stripper plate and biasing the distal end of the second stripper plate toward the center of the elongated gap;
wherein a biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates; and wherein the first and second stripper plates are configured to move laterally upon contact with crop introduced into the elongated gap.

2. The stripper plate system of claim 1, wherein the first and second stripper plates are configured to move laterally relative to the frame independently of each other.

3. The stripper plate system of claim 1, wherein the proximal end of the first stripper plate is configured to move laterally relative to the frame independently of the distal end of the first stripper plate.

4. The stripper plate system of claim 3, wherein as the proximal end of the first stripper plate moves laterally relative to the frame, the distal end of the first stripper plate pivots at a pivot point.

5. The stripper plate system of claim 1, wherein the proximal end of the second stripper plate is configured to move laterally relative to the frame independently of the distal end of the second stripper plate.

6. The stripper plate system of claim 5, wherein as the proximal end of the second stripper plate moves laterally relative to the frame, the distal end of the second stripper plate pivots at a pivot axis.

7. The stripper plate system of claim 1, wherein the distal ends of the first and second stripper plates are configured to move laterally relative to the frame independently of the proximal ends of the first and second stripper plates.

8. The stripper plate system of claim 1, wherein the elongated gap extends between the first lateral sides of the first and second stripper plates.

9. The stripper plate system of claim 1, wherein, in a first operative mode, introduction of the crop into the elongated gap at the proximal end of the first and second stripper plates moves the first and second stripper plates laterally at the proximal ends to accommodate a diameter of the crop.

10. The stripper plate system of claim 9, wherein lateral movement of the first and second stripper plates at the proximal ends to accommodate the diameter of the crop results in an increase in a proximal gap distance of the elongated gap.

11. The stripper plate system of claim 9, wherein the first and second stripper plates move laterally at the proximal ends to accommodate the diameter of the crop without changing a distal gap distance between the distal ends of the first and second stripper plates.

12. The stripper plate system of claim 9, wherein as the crop moves toward a midpoint of the elongated gap between the proximal and distal ends of the elongated gap, a width of the elongated gap at the midpoint increases while a proximal gap distance of the elongated gap decreases.

13. The stripper plate system of claim 12, wherein as the crop moves toward the distal end of the elongated gap, the proximal gap distance of the elongated gap decreases and a distal gap distance of the elongated gap increases.

14. The stripper plate system of claim 1, wherein the first lateral side of the first and second stripper plates defines an outwardly tapering section at the proximal end of the first and second stripper plates.

15. The stripper plate system of claim 14, wherein the outwardly tapering section at the proximal end of the first and second stripper plates forms a proximal gap distance dimensioned greater than a distal gap distance.

16. The stripper plate system of claim 1, wherein the first, second, third and fourth tensioning mechanism comprise at least one of a rubber bushing, a pull spring, a torsion spring, or a compression spring.

17. The stripper plate system of claim 1, wherein the first and third tensioning mechanisms are different from the second and fourth tensioning mechanisms.

18. A harvester header, comprising:
a frame;
a stripper plate system comprising:
a first stripper plate movably mounted to the frame, the first stripper plate comprising an elongated body with a proximal end, a distal end, a first lateral side, and a second lateral side;
a second stripper plate movably mounted to the frame in an opposing orientation to the first stripper plate, the second stripper plate comprising an elongated body with a proximal end, a distal end, a first lateral side, and a second lateral side, the second stripper plate being movably mounted to the frame such that the first lateral side of the second stripper plate faces the first lateral side of the first stripper plate and forms an elongated gap between the first and second stripper plates, and the elongated gap comprising a proximal end and a distal end;
a first tensioning mechanism mounted at or near the proximal end of the first stripper plate and biasing the proximal end of the first stripper plate toward a center of the elongated gap;
a second tensioning mechanism mounted at or near the distal end of the first stripper plate and biasing the distal end of the first stripper plate toward the center of the elongated gap;
a third tensioning mechanism mounted at or near the proximal end of the second stripper plate and biasing the proximal end of the second stripper plate toward the center of the elongated gap; and
a fourth tensioning mechanism mounted at or near the distal end of the second stripper plate and biasing the distal end of the second stripper plate toward the center of the elongated gap;
wherein a biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates; and
wherein the first and second stripper plates are configured to move laterally upon contact with crop; and
a conveyor system comprising a first conveyor disposed above the first stripper plate and a second conveyor disposed above the second stripper plate, the first and second conveyors configured to direct the crop from the proximal end to the distal end of the elongated gap.

19. The harvester header of claim 18, wherein the first conveyor and the second conveyor each comprise one or a plurality of chains.

20. The harvester header of claim 18, wherein the first conveyor and the second conveyor each comprise one or a plurality of belts.

21. A harvester, comprising:
a header including:
a frame;
a stripper plate system comprising:
a first stripper plate movably mounted to the frame, the first stripper plate comprising an elongated body with a proximal end, a distal end, a first lateral side, and a second lateral side;

a second stripper plate movably mounted to the frame in an opposing orientation to the first stripper plate, the second stripper plate comprising an elongated body with a proximal end, a distal end, a first lateral side, and a second lateral side, the second stripper plate being movably mounted to the frame such that the first lateral side of the second stripper plate faces the first lateral side of the first stripper plate and forms an elongated gap between the first and second stripper plates, and the elongated gap comprising a proximal end and a distal end;

a first tensioning mechanism mounted at or near the proximal end of the first stripper plate and biasing the proximal end of the first stripper plate toward a center of the elongated gap;

a second tensioning mechanism mounted at or near the distal end of the first stripper plate and biasing the distal end of the first stripper plate toward the center of the elongated gap;

a third tensioning mechanism mounted at or near the proximal end of the second stripper plate and biasing the proximal end of the second stripper plate toward the center of the elongated gap; and a fourth tensioning mechanism mounted at or near the distal end of the second stripper plate and biasing the distal end of the second stripper plate toward the center of the elongated gap;

wherein a biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates; and wherein the first and second stripper plates are configured to move laterally upon contact with a crop; and a conveyor system comprising a first conveyor disposed above the first stripper plate and a second conveyor disposed above the second stripper plate, the first and second conveyors configured to direct the crop from the proximal end to the distal end of the elongated gap; and a roll system comprising a first roll rotatably disposed below the first stripper plate and a second roll rotatably disposed below the second stripper plate; and a processing system configured to process crop introduced into the processing system from the roll system.

22. A method of operating a harvester header, comprising:

introducing crop into a stripper plate system, the stripper plate system comprising:
  a first stripper plate movably mounted to a frame, the first stripper plate comprising an elongated body with a proximal end, a distal end, a first lateral side, and a second lateral side;
  a second stripper plate movably mounted to the frame in an opposing orientation to the first stripper plate, the second stripper plate comprising an elongated body with a proximal end, a distal end, a first lateral side, and a second lateral side, the second stripper plate being movably mounted to the frame such that the first lateral side of the second stripper plate faces the first lateral side of the first stripper plate and forms an elongated gap between the first and second stripper plates, and the elongated gap comprising a proximal end and a distal end;

biasing the proximal end of the first stripper plate toward a center of the elongated gap with a first tensioning mechanism mounted at or near the proximal end of the first stripper plate;

biasing the distal end of the first stripper plate toward the center of the elongated gap with a second tensioning mechanism mounted at or near the distal end of the first stripper plate;

biasing the proximal end of the second stripper plate toward the center of the elongated gap with a third tensioning mechanism mounted at or near the proximal end of the second stripper plate;

biasing the distal end of the second stripper plate toward the center of the elongated gap with a fourth tensioning mechanism mounted at or near the distal end of the second stripper plate;

moving the first and second stripper plates laterally upon contact with the crop; and directing the crop from the proximal end to the distal end of the elongated gap with a conveyor system comprising a first conveyor disposed above the first stripper plate and a second conveyor disposed above the second stripper plate;
  wherein a biasing force of the first and third tensioning mechanisms is lower than a biasing force of the second and fourth tensioning mechanisms such that a lower biasing force is imparted at the proximal end of the first and second stripper plates than the biasing force imparted at the distal end of the first and second stripper plates.

* * * * *